United States Patent [19]
Hermsen et al.

[11] 3,903,988
[45] Sept. 9, 1975

[54] ROCKET NOISE GENERATOR

[75] Inventors: Robert William Hermsen, Palo Alto; Paul G. Willoughby, Santa Clara, both of Calif.

[73] Assignee: The United States of America as represented by the Secretary of the Navy, Washington, D.C.

[22] Filed: Oct. 11, 1968

[21] Appl. No.: 766,700

[52] U.S. Cl............................ 181/142; 116/137 A
[51] Int. Cl.² ...................................... G10K 10/00
[58] Field of Search....... 116/137 A, 137; 181/0.5 J, 181/142, 159, 110, 118, 120, 39; 114/20; 60/254, 35.6 RS; 340/3 E, 7 R

[56] References Cited
UNITED STATES PATENTS
3,326,467  6/1967  Fortman ........................... 116/137

*Primary Examiner*—Maynard R. Wilbur
*Assistant Examiner*—T. M. Blum
*Attorney, Agent, or Firm*—Richard S. Sciascia; Don D. Doty

[57] ABSTRACT

A combination underwater rocket-ultrasonic noise generator having variously configured and located slots disposed in the inside wall of the rocket driving exhaust nozzle.

16 Claims, 6 Drawing Figures

PATENTED SEP 9 1975                                    3,903,988
SHEET 1 OF 2
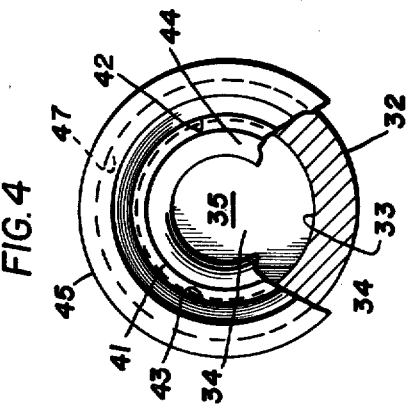
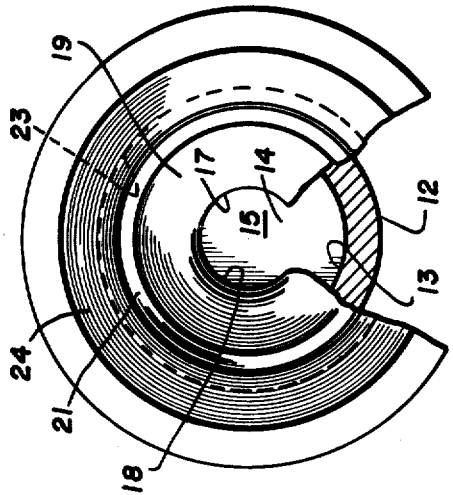
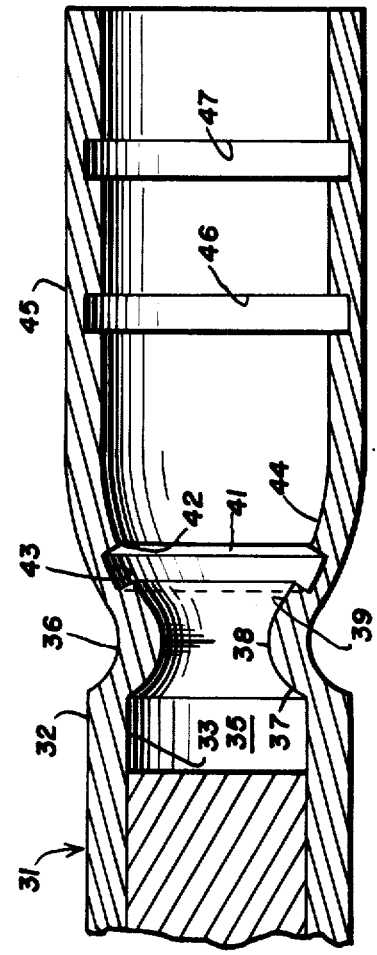
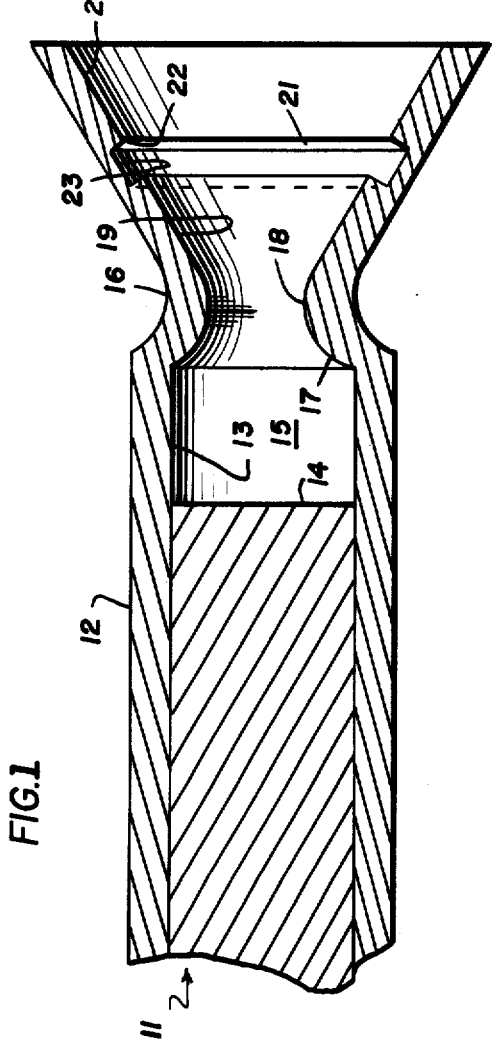
ROBERT W. HERMSEN
PAUL G. WILLOUGHBY
INVENTORS
BY
Don D. Doty
Attorney

ROBERT W. HERMSEN
PAUL G. WILLOUGHBY
INVENTORS 3,903,988

ROCKET NOISE GENERATOR

The present invention relates generally to acoustical energy generators and, in particular, is a combination high-level ultrasonic noise generator and underwater rocket-propelled vehicle, the ultrasonic noise output of which is generated within a narrow frequency band at the same time the vehicle is being propelled through its aqueous environmental medium by the exhaust gases of its rocket engine.

Heretofore, numerous acoustical energy generators have been in operation for various and sundry purposes. In some instances, noise and other acoustical energy generators have been mounted on underwater vehicles for marker purposes, decoy purposes, communication purposes, echo-ranging purposes, and the like. In addition, such conventional devices as sirens and whistles have been used for such sound generating purposes, and they have frequently been driven by the hot combustion products and exhaust gases of rocket propulsion engines. Of course, many of such prior art acoustical generators and acoustical generator-underwater vehicle combinations have been eminently satisfactory for their intended purposes. However, in many instances, they also leave a great deal to be desired because they are structurally complex, have numerous moving parts, require complicated associated electronic, pneumatic, or mechanical driving equipment, are awkward, unweildy and unreliable, and are expensive to manufacture and operate. Although those that employ direct mechanical driving equipment ordinarily achieve relatively high efficiencies, their power requirements are great, they are usually limited in their operational frequency ranges, and they are sometimes restricted to frequencies that are lower than those desired. And those that are directly or indirectly gas actuated, in most instances, have not produced very high power sonic outputs, due to excessive acoustic mismatches between the operative gases (or their associated apparatus) and the ambient water effectively interacting therewith.

The instant invention overcomes many of the disadvantages of the prior art signal generators that are intended to be used in conjunction with an underwater rocket vehicle in that it is the essence of mechanical and structural simplicity and it can be easily and economically incorporated therein as an integral part thereof. Furthermore, it lends itself readily to copious design changes, which increase its usable frequency ranges and, thus, its application and utility to a considerable extent, without materially adversely affecting the rocket propulsion system and operation of the vehicle in which it is included. In addition, because it has no moving parts, the reliability and effectiveness thereof are considerably increased and the operation thereof is automatic and, hence, considerably simplified.

It is, therefore, an object of this invention to provide an improved underwater sound generator.

Another object of this invention is to provide an improved acoustical energy generator.

Another object of this invention is to provide an improved subaqueous ultrasonic noise generator.

Still another object of this invention is to provide a unique combination underwater rocket or jet propulsion-ultrasonic noise generator.

A further object of this invention is to provide an improved method and means for generating a mobile ultrasonic noise within a predetermined narrow frequency band.

A further object of this invention is to provide an improved method and means for simultaneously driving an underwater vehicle and producing predetermined frequency acoustical energy within the water ambient thereto.

Another object of this invention is to provide a new and unique sound generating rocket nozzle.

Another object of this invention is to provide a more efficient predetermined acoustical energy source for rocket and jet powered submarine vehicles.

Still another object of this invention is to provide an improved gas driven acoustical energy generator that requires a minimum of power for the driving thereof.

Another object of this invention is to provide an improved chemical-mechanical reaction method and means for producing a high-level ultrasonic noise within a given narrow frequency band.

Other objects and many of the attendant advantages will be readily appreciated as the subject invention becomes better understood by reference to the following detailed description, when considered in conjunction with the accompanying drawings wherein:

FIG. 1 is a partial cross-sectional view of a preferred embodiment of the subject invention;

FIG. 2 is a propulsion rear end view with parts broken away of the device of FIG. 1;

FIG. 3 is a partial cross-sectional view of another preferred embodiment of the invention;

FIG. 4 is a propulsion rear end view with parts broken away of the device of FIG. 3;

Figure 5:
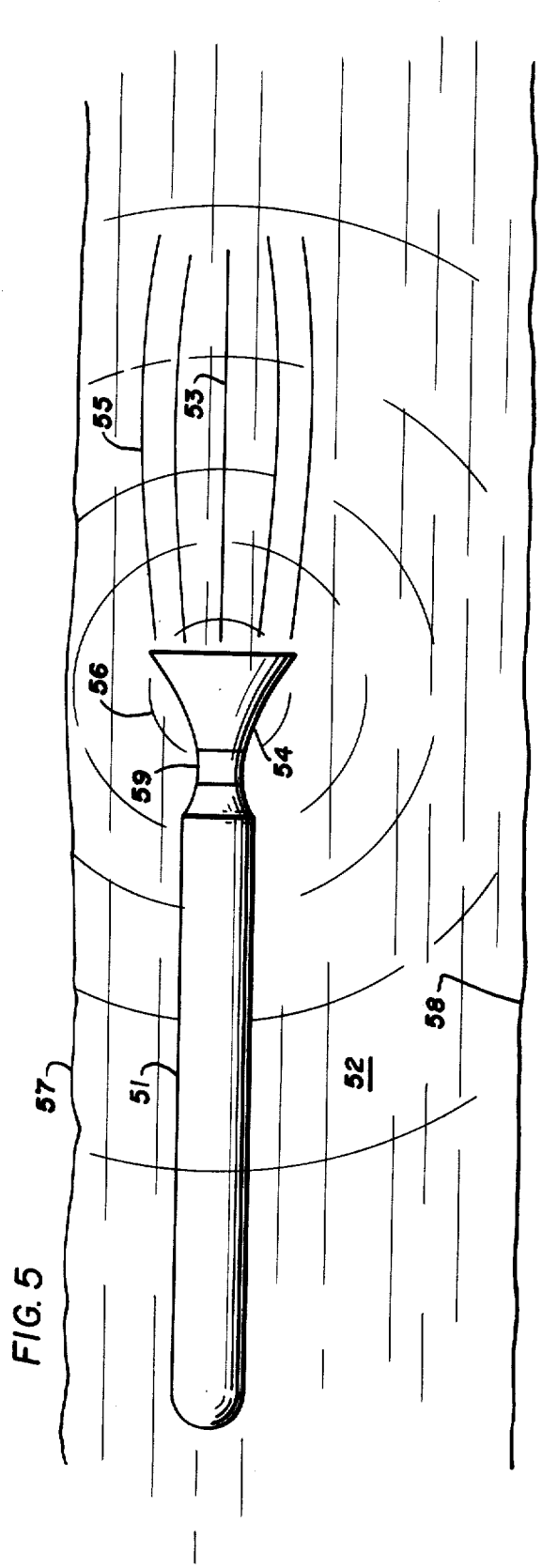
FIG. 5 is a quasi-pictorial view of a unique application of the invention.

Although the preferred embodiments disclosed herewith are depicted as being rocket vehicles which generate a given acoustical energy or ultrasonic noise, it should be understood that the scope of the invention is intended to be such that vehicles having jet propulsion or any other propulsion systems that exhaust a predetermined gas through a nozzle are included. Moreover, it is also intended that said vehicles may function within any given environmental medium, although the preferred embodiments shown herewith are considered to be underwater missiles or vehicles and the sound to be generated thereby is broadcast throughout the aqueous environment ambient thereto. In other words, to construct the subject invention in such manner as to make it operate as desired in any particular environmental medium would merely involve the making of appropriate design choices, the making of which would obviously be well within the purview of one skilled in the art having the benefit of the teachings presented herewith.

Furthermore, inasmuch as it is well known that all vehicles which move through water or other environmental medium as a result of the forceful expulsion of exhaust gases makes some noise, it should be understood that the subject invention is intended to produce a predetermined sound, ultrasonic energy, or noise in addition to that inherently produced by conventional nozzle exhaust systems. Accordingly, the unique structure which effects such results will now be discussed in sufficient detail for the skilled artisan to make and use it.

Referring now to FIGS. 1 and 2, there is shown a vehicle 11, which may be an underwater rocket, or the like. Vehicle 11 has, in this particular embodiment, an elongated body 12 within which is located a combustion chamber 13. Disposed in chamber 13 is a propellant fuel 14 adapted for burning upon ignition by any suitable igniter, not shown because it plays no patentably significant part in the invention. Once ignited, fuel 14 generates a gaseous fluid 15, which is exhausted through a unique nozzle 16 that is connected to the rearward end of vehicle body 12.

Nozzle 16 is, on the one hand, a conventional propulsion nozzle adapted for converting fluid 15 of a given pressure into one having a given propellant velocity. Thus, it contains a convergent entrance section 17, a throat section 18, and a divergent or flared exit section 19. Of course, it is convergent entrance section 17 that is connected to the aft end of body 11, and it is divergent exit section 19 that exhausts velocity characterized propellant fluid or gas 15 into the ambient environment. On the other hand, it is a unique nozzle because it has a slot or groove 21 located in the inside wall of the divergent exit section thereof. Groove 21 may have any desired geometrical configuration that will produce the desired results; however, in this preferred embodiment, it is disclosed as being oblong in shape, as having square corners 22, as having a bottom surface 23 that substantially parallels the inside surface 24, and as being located in the same plane that is essentially transverse with respect to the longitudinal axis of the vehicle and of the nozzle itself. Of course, it should be understood that other groove configurations, such as, for instance, round, triangular, square, or the like, may be incorporated in the wall of nozzle 16, with the only design limit placed thereon being that it should produce the desired results for any given operational situation. Moreover, groove 21 may be located at any predetermined distance from the end of nozzle 16, and the dimensions thereof should be such as will provide the acoustical frequency desired. Of course, such things are merely design factors to take into consideration with such other factors as mass, combustion rate, temperature, and velocity of the propulsion gases to be used therewith, when the subject invention is being constructed. Also, the mission, intended use, and environmental medium in which it is to be operated must be taken into consideration, too. Fortunately, the artisan having the benefit of the teachings presented herewith would be able to make the proper design selections that would be necessary to make, in order to tune the acoustical output signal to have whatever frequency the operational circumstance requires.

The device of FIGS. 3 and 4 constitute another preferred embodiment of the invention. Shown therein is another vehicle 31, which may likewise be an underwater rocket, or the like. It has an elongated body 32 within which is located a combustion chamber 33, and disposed in combustion chamber 33 is a propellant fuel 34 adapted for burning upon ignition. Like the device of FIG. 1, ignition of the particular fuel employed may be accomplished in any conventional manner; and, since the igniter per se plays no patentably significant part in this invention, a structural embodiment therefor has not been disclosed herein. Once ignited, fuel 34 generates a gaseous fluid 35, which is exhausted through another unique nozzle 36 that is integrally connected to the rearward end of vehicle body 32.

Nozzle 36 is conventional in certain respects and unique in certain respects. It is conventional, in that it converts fluid 35 at a given pressure into the same fluid having a corresponding propellant velocity. Therefore, for so doing, it contains a convergent entrance section 37, a throat section 38, and a divergent or flared (straight or bell shaped) section 39. As may readily be seen, it is convergent entrance section 37 that is integrally connected to the aft end of body 31, and it is divergent exit section 39 that effects the exhaust of the velocity characterized propellant fluid or gas 35 out of the rear end thereof and into the ambient environment.

Nozzle 36 is a unique nozzle because it has a slot or groove 41 cut within the inside wall of the divergent exit section thereof. Like groove 21, groove 41 may have any geometrical configuration that will produce a strong reliable structure and the desired operational results. But for the sake of simplicity of disclosure, it is disclosed herewith as being substantially oblong in cross-section, as having square corners 42, as having a bottom surface 43 that parallels the inside surface 44, and as being located within the same plane that is essentially transverse to the longitudinal axis of the entire vehicle and the nozzle, as well. The groove configurations that may be employed to an advantage in actual practice are numerous. Thus, like groove 21, it may be semi-circular, triangular, square, or the like in cross-section, as long as it has an opening into the nozzle per se. Furthermore, groove 41 may be located at any given distance from the end of nozzle 36, as long as it is located within the diverging section thereof. The dimensions of groove 41 should be designed to carry its operational share of the total work load of the invention at the desired acoustical frequency.

Integrally attached to the aft end of nozzle 36 is a substantially cylindrical, pipe-like extension 45 which tends to provide greater control of the boundary of the propellant gases, as they are exhausted therefrom. In addition, it facilitates the generation of additional acoustical power due to its increased area being in contact with the ambient environmental medium and due to the fact that it has several other grooves 46 and 47 located therein. Grooves 46 and 47 may, of course, have whatever geometrical configuration that is warranted by operational circumstances. They are, likewise, located along the length of extension 45 as necessary to produce the sound energy desired. And, although only three grooves are shown in the device of FIG. 3, any number thereof may be used. Again, the making of the proper selection of the number, size, and shape thereof is well within the purview of one skilled in the art having the benefit of the teachings presented herewith and, hence, would be taken into consideration thereby, in order to tune the output signal therefrom to have whatever frequency the operational circumstances require.

With respect to both of the foregoing species of the subject invention, the materials used in the walls forming the respective nozzle and nozzle extensions should be such as would allow them to withstand the pressures and temperatures to which they are subjected. Furthermore, the thickness thereof should be such as to allow the grooves or slots incorporated therein to have the necessary dimensions, locations, and configurations for their operational purposes and still be strong enough and flexible enough to vibrate without being destroyed by fatigue stresses. A favorable acoustic impedance match inherently exists between typical nozzle construction materials, such as steel and ambient water.

The preferred embodiments of the invention disclosed herewith are, for the purpose of simplicity of disclosure, shown to include rocket motors as the propulsion means therefor; however, it should be understood that a jet propulsion or any other propulsion means may be used which produces gases or fluids suitable to be exhausted rearwardly through the exhaust nozzle thereof.

The operation of the invention will now be discussed in conjunction with all of the figures of the drawing.

As exemplarily illustrated in FIG. 5, an underwater missile or vehicle 51 incorporating the invention is being propelled within sea water 52 by the gases 53 rearwardly exhausted from nozzle 54. The circumferential boundary 55 thereof is controlled by the design configuration of the exhaust nozzle and particularly by the amount of rearward flare and extension included therein.

Missile or vehicle 51 also has slots in the inner surface of the nozzle section thereof which are comparable to those or any combination of those depicted in or taught with respect to the devices of FIGS. 1 through 4, although they are not shown in this view.

As the vehicle is being driven forward through the water, the supersonic flow of hot combustion gas products 53 over said slots generates ultrasonic energy 56 in a narrow frequency band and causes it to be broadcast through the ambient sea water 52. Because the slot walls form part of the entire resonant system, the ultrasonic energy transfer to the nozzle wall — or the nozzle wall and rear extension, as the case may be — is very efficient and causes it to vibrate at some particular frequency. Of course, the ultrasonic energy transfer from the external surface of the vibrating nozzle wall to the surrounding water is also very efficient because of the direct contact therewith and the favorable acoustic impedance match therebetween. Hence, it may readily be seen, that the overall efficiency thereof is, likewise, very good or, at least, optimized.

Of course, the subject invention may be operated at any predetermined water depth or depths that will cause its intended purpose to be accomplished. Thus, the broadcast of acoustical energy 56, if it is of sufficient power, may be radiated to and perhaps through the interface of the water and atmosphere 57 and to and perhaps through the interface of the water and sea floor 58, so as to penetrate said atmosphere and sea floor. Obviously, the various and sundry operational parameters and design characteristics involved determine the actual acoustical energy broadcast distance effected by the invention; but due to its optimized impedance match therebetween and the sea water, the power, efficiency, and actual practical results produced thereby are of worthwhile significance. Accordingly, the specific application of the subject invention portrayed in FIG. 5 ostensively effects improved results not obtainable from the comparable prior art.

In some instances, it may not be feasible to design the nozzle of the invention such that it will vibrate in its entirety at a desired frequency; however, it is still possible to design a portion thereof to vibrate at the desired frequency by acoustically isolating it to some extent from the remainder thereof and from the vehicle. Such a design is schematically illustrated in the device of FIG. 5 by incorporating therein a representative type of acoustic isolation means, such as, for example, a suitable throat section 59 which is made of any acoustic isolating material that will still maintain the necessary structural characteristics to function as the throat section of a rocket nozzle. Depending on the circumstances, certain fiberglass, plastics, or other metals which provide sufficient acoustic mismatch between the sections intended to be isolated may be used for such purposes. Of course, throat section 18 of nozzle 16 of the device of FIG. 1 and throat section 38 of nozzle 36 of the device of FIG. 2 could likewise include such acoustical vibration frequency isolation means, in the event operational circumstances so warrant. Obviously, it would merely be a matter of design choice of the artisan to make it an integral part thereof or an appropriately joined separate section thereof. Moreover, it would be obvious for the artisan having the benefit of the teachings presented herewith to incorporate such acoustical isolation means in any other section of nozzles 16 and 36, if so desired, or even between the main body of the rocket and its respective exhaust nozzle.

Figure 6:
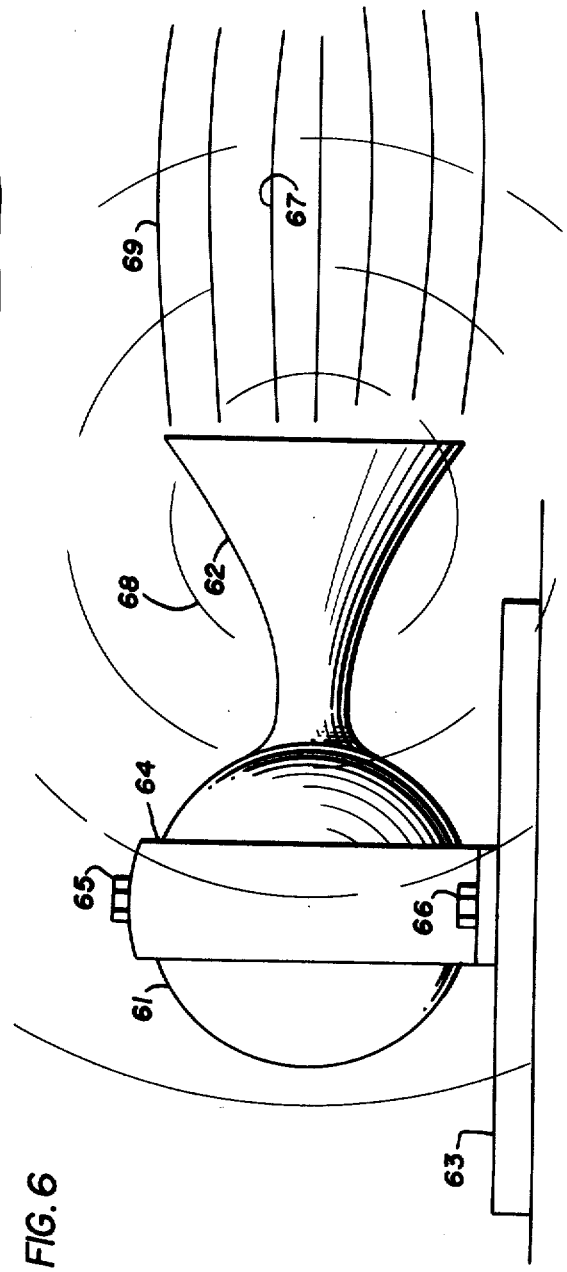
FIG. 6 is a quasi-pictorial view of another application of the subject invention.

FIG. 6 shows still another application of the subject invention. It may be considered to be located in water, in the atmosphere, or anywhere else capable of propagating acoustical energy.

A motor body 61 containing a gas producing fuel (not shown) has a nozzle 62 attached to the aft end thereof, which may be identical to either of those shown in FIGS. 1 and 3. Hence, it also includes slots or grooves similar to the slots or grooves included therein for sound generating purposes.

In this particular case, motor body 61 may be securely mounted to the earth, a predetermined fixed structure, a moving vehicle, or any other suitable mounting means 63 by a strap 64 and bolts 65 and 66 or the like which prevents its being moved relative thereto. Therefore, in this particular application, the subject invention may be considered as being a fixed noise generator only, rather than a combination mobile submarine vehicle-ultrasonic energy generator, such as that depicted in FIG. 5. The environmental medium in which it is operated would obviously determine the design parameters to be incorporated in this species of the invention.

Upon ignition of the fuel within motor body 61, the combustion thereof produces gases 67 which are, in turn, exhausted across the slots of exhaust nozzle 62, to effect the vibration thereof in such manner as to cause the outside surface of the walls thereof to broadcast acoustical energy 68 at some certain frequency throughout the ambient environment, regardless of the kind it is.

Like in the embodiment disclosed in FIG. 5, the circumferential boundary 69 of exhaust gases 67 is determined by the particular flare designed into exhaust nozzle 62, and, of course, the frequency and intensity or power of the sonic energy produced is contingent upon the amount and quality of the gases exhausted therefrom.

From the foregoing, it may readily be seen that slotted exhaust and/or propulsion nozzles 16 and 36 of FIGS. 1 and 3 are unique per se, and when incorporated in underwater or other suitable rocket or jet propelled devices, such as those of FIGS. 5 and 6, new and improved combinations of elements are assembled which produce new and improved types of mobile submarine propulsion and sound source systems.

Obviously, other embodiments and modifications of the subject invention will readily come to the mind of

What is claimed is:

1. A sound generator comprising in combination:
   a propulsion nozzle, having a converging entrance section, a diverging exit section, and a throat section connected therebetween, for converting a predetermined fluid at a given pressure supplied to the entrance section thereof into a fluid having a given velocity that is ejected from the exit section thereof;
   a groove located within and around the inside wall of the diverging exit section of said propulsion nozzle in such manner as to be contacted by said predetermined fluid as it passes therethrough and thereby effect the vibration thereof at a predetermined frequency; and
   means connected to the converging entrance section of said propulsion nozzle for supplying said predetermined pressurized fluid thereto.

2. The device of claim 1 wherein said sound generator is a propelled mobile underwater vehicle that broadcasts acoustical energy throughout the water in which it is submerged in response to the vibration of certain walls thereof effected by said predetermined fluid contacting said groove as it passes through and is ejected from the divergent exit section of the propulsion nozzle thereof.

3. A sound generator comprising in combination:
   a nozzle, having a converging entrance section, a diverging exit section, and a throat section connected therebetween, for converting a predetermined fluid at a given pressure supplied to the entrance section thereof into a fluid having a given velocity that is ejected from the exit section thereof;
   an acoustic isolation means inserted between predetermined fore and aft sections of said nozzle for isolating the respective resonant frequency vibrations thereof;
   a pipe-like extension of predetermined length, of predetermined constant diameter, and of predetermined wall thickness connected to the exit end of the diverging exit section of said nozzle;
   a groove located within and around the inside wall of said pipe-like extension in such manner as to be contacted by said predetermined fluid as it passes therethrough and thereby effects the vibration thereof at a predetermined frequency; and
   means connected to the converging entrance of said nozzle for supplying said pressurized fluid thereto.

4. The device of claim 1 wherein said predetermined fluid is a gas.

5. The device of claim 1 wherein said groove has a predetermined depth and is configured in such manner as to have substantially square corners.

6. The device of claim 1 wherein said means connected to the converging entrance section of said propulsion nozzle for supplying said predetermined fluid thereto comprises:
   an underwater rocket body;
   a motor combustion chamber located inside said underwater rocket body; and
   a combustible fuel disposed within said motor combustion chamber for producing said predetermined pressurized fluid upon ignition thereof.

7. The invention of claim 1 further characterized by a pipe-like extension of predetermined length and wall thickness connected to the large diameter end of the diverging exit section of said propulsion nozzle.

8. The invention of claim 1 further characterized by:
   a pipe-like extension of predetermined length and wall thickness connected to the large diameter end of the diverging exit section of said propulsion nozzle; and
   a groove located within and around the inside wall of said pipe-like extension.

9. The invention of claim 1 further characterized by:
   a pipe-like extension of predetermined length and wall thickness connected to the aft end of the diverging exit section of said propulsion nozzle; and
   a plurality of grooves spatially disposed within and around the inside wall of said pipe-like extension.

10. The invention of claim 1 further characterized by:
    a pipe-like extension of predetermined length and wall thickness connected to the large diameter end of the diverging exit section of said propulsion nozzle;
    a groove located within and around the inside wall of said pipe-like extension; and
    another groove spatially disposed from said last mentioned groove located within and around the inside wall of said pipe-like extension.

11. The invention of claim 1 further characterized by means connected to said sound generator for the mounting thereof in a predetermined fixed position.

12. The device of claim 1 wherein said propulsion nozzle has a wall of such thickness and geometrical configuration as to vibrate at a predetermined natural frequency as a result of said predetermined fluid contacting said groove as it passes through said propulsion nozzle.

13. The device of claim 12 wherein the predetermined natural frequency of vibration of the wall of said propulsion nozzle is within a narrow band of the ultrasonic frequency range.

14. The invention of claim 12 further characterized by an acoustic isolation means inserted between predetermined fore and aft sections of the geometrically configured wall of said propulsion nozzle for isolating the respective resonant frequency vibrations thereof.

15. The invention of claim 3 further characterized by at least another groove located within and around the inside wall of said pipe-like extension.

16. The invention of claim 3 further characterized by a plurality of grooves located within and around the inside wall of said pipe-like extension.

* * * * *